United States Patent [19]
Andrew et al.

[11] Patent Number: 5,869,912
[45] Date of Patent: Feb. 9, 1999

[54] DIRECT-COOLED DYNAMOELECTRIC MACHINE STATOR CORE WITH ENHANCED HEAT TRANSFER CAPABILITY

[75] Inventors: Philip Lynn Andrew, Glenville; Frederick John Rink, Jr., Clifton Park, both of N.Y.

[73] Assignee: General Electric Co., Schenectady, N.Y.

[21] Appl. No.: 900,788

[22] Filed: Jul. 25, 1997

[51] Int. Cl.⁶ ...................................................... H02K 9/00
[52] U.S. Cl. ................................ 310/52; 310/54; 310/59; 310/65; 310/64; 310/60 A; 310/61; 310/66
[58] Field of Search ................................. 310/52, 54, 59, 310/65, 64, 60 A, 61, 66

[56] References Cited

U.S. PATENT DOCUMENTS

| | | | |
|---|---|---|---|
| 925,271 | 6/1909 | Behrend | 310/65 |
| 925,991 | 6/1909 | Brown | 310/65 |
| 4,182,966 | 1/1980 | Mishra et al. | 310/59 |

*Primary Examiner*—Nestor Ramirez
*Assistant Examiner*—Thanh Lam
*Attorney, Agent, or Firm*—Nixon & Vanderhye

[57] ABSTRACT

In a dynamoelectric machine stator core assembly wherein adjacent packages of stacked laminations are separated by a plurality of radially extending spacer blocks, and wherein each adjacent pair of spacer blocks define in cooperation with adjacent axially spaced laminations, a cooling duct, the improvement comprising a plurality of turbulator elements in each cooling duct, each turbulator element extending into the duct from one of the adjacent axially spaced laminations.

12 Claims, 7 Drawing Sheets

DIRECT-COOLED DYNAMOELECTRIC MACHINE STATOR CORE WITH ENHANCED HEAT TRANSFER CAPABILITY

TECHNICAL FIELD

This invention relates generally to dynamoelectric machines, and particularly to a means of improving the rate of heat transfer within cooling ducts used to ventilate the stator core of such machines.

BACKGROUND

As is commonly understood by those practiced in the art of electrical generator design, the capacity of current machines for power generation is constrained by physical size, which is to be minimized in order to also minimize cost. Designers are further cognizant of size and weight limitations imposed by domestic and foreign ground transportation systems.

It is also commonly understood that magnetic and resistive losses within the stator generate heat which must be dissipated in order to avoid electro-mechanical failure, and that these losses pose a serious constraint on the capacity of a machine of given physical dimension. The high thermal capacity and thermal conductivity of gaseous hydrogen have been successfully exploited in the past by manufacturers seeking to satisfy customer's needs for increased capacity, within the constraints of physical shipping envelope and thermal loading. For those customers who are unwilling to suffer the additional cost and complexity of hydrogen cooling, manufacturers must devise the means to manage increases in thermal loading that accompany their efforts to coax additional capacity from machines of a given physical dimension.

The current state of the art is typified by a radial duct formed by separating stator core laminations by radially arranged inside spacer blocks, as shown in FIG. 1 and as described further below. Gaseous fluid flow is encouraged to progress in a radially-inward direction from a plenum area posterior to the stator core to the rotor/stator air gap (a radially-outward flow direction is also possible). These radial ducts are arranged in what is known as packages; a package being comprised of several steel laminations (seventy, in one example) stacked one atop the other. The packages are separated by the radially oriented inside spacer blocks, which, along with adjacent laminations of adjacent packages, define the radial ventilation ducts.

The fluid flow within the core lamination packages removes ohmic losses and magnetic losses by convective heat transfer. Those practitioners possessing ordinary levels of skill in the art will recognize this configuration as common, and will additionally recognize this flow to be turbulent in the fluid-dynamic sense in the tooth (radially inner) region of the duct. The inventors are also not aware of any previous effort to augment heat transfer in the stator core duct by means of a turbulence-enhancing or surface-area-enhancing devices. The inventors are not aware of any other application of turbulators to the stators of turboalternators; although the use of turbulators to increase the cooling rates within the interior flow passages of aircraft jet engine turbine blades is known.

DISCLOSURE OF THE INVENTION

The invention has an important application in increasing the power output capability of turboalternators of a given physical dimension, resulting in a reduction in production cost per MW of output. Alternatively, the invention permits a reduction in physical dimension of machines of a given rating, which likewise results in a cost savings. A third possible application of the invention is in the reduction of parasitic cooling flow pumping loss and windage, resulting in an improvement in overall efficiency, and a reduction in perceived noise level. The invention entails only a minor modification of the existing stator core design and requires the addition of no new components. The invention has an immediate application to a large class of dynamoelectric machines which employ the gaseous flow of air or hydrogen, (and potentially to other gases such as helium) for cooling.

In the exemplary embodiments disclosed herein, the invention comprises of a plurality of protuberances, known hereinafter as "turbulators", but also known in the art of heat transfer as ribs or trips, which extend into the stator core cooling ducts. The primary function of the turbulator is to enhance the degree of turbulent, fluid-dynamic mixing between heated fluid adjacent to the duct wall and relatively cooler fluid near the duct centerline. This enhanced level of mixing brings cooler fluid in contact with the duct wall, creating greater potential for heat transfer. A secondary feature of the turbulated duct is an increase in surface area exposed to the convective cooling gas. A third feature is the creation of areas within the duct in the vicinity of the turbulator of local fluid-dynamic separation and reattachment at which local enhancement of heat transfer occurs.

The invention described in this disclosure thus meets the requirements noted above through increased rates of heat removal from the armature winding of the generator of large capacity electrical turboalternators. The invention also meets the increasingly important need for inventory control, in that no new components are introduced into the generator as a result of the invention. Lastly, the invention meets the need for broad applicability across an entire product line, as it can be applied in conjunction with any gaseous or liquid cooling medium presently in use or reasonably anticipated for future application by those skilled in the art.

Thus, this invention seeks a significant reduction in the temperature drop between the stator conductor turns and the cold gas temperature for a given expenditure in parasitic cooling flow pumping loss. This greater capability may be exploited to design generators of greater output for a given physical dimension. Alternatively, the invention permits a reduction in parasitic cooling flow pumping loss and windage, resulting in an increase in efficiency and a reduction in noise, for a given rating and physical dimension.

This invention also offers the customer increased output for a given machine size, particularly in cases where the capacity of a unit is near the transition point between cooling technologies. For example, this invention may enable the application of an air-cooled machine at a rating which would otherwise have called for a hydrogen-cooled machine. This is a commercially attractive feature, since, many customers seek to avoid the added cost, safety concern, and complexity of hydrogen cooling. As second example, this invention may enable the application of a hydrogen-cooled machine at a rating which would otherwise have called for a liquid-cooled stator bar design. In this case, the cost and complexity of a deionized water skid is obviated.

A particular advantage of the invention is that it is a completely passive heat transfer augmentation method, requiring no chemical additives, acoustical input or other active stimuli. The invention is especially easily manufactured, requiring only a simple slitting and forming operation as one of the stages of forming the lamination in a punch press. The invention does not require precise tolerances in order to function as expected. Lastly, the invention is applicable to the entire product line, for both air-cooled and hydrogen cooled machines, and in fact is applicable to any liquid or gaseous cooling medium.

In a first embodiment of the invention, the turbulators are formed in the yoke or radially outer region of one of the two laminations which form a respective coolant passage. The turbulators are radially spaced from each other, within each of the radial ducts. The turbulators extend generally perpendicular to the flow direction, and extend into the duct approximately 20% of duct height (i.e., the dimension between adjacent laminations as defined by the inside spacer blocks).

In a second and presently preferred embodiment, similar turbulators are formed primarily in the tooth regions of the respective lamination, extending only partially into the yoke region.

In a third embodiment, each turbulator is formed by a pair of tabs oriented in a substantial, V-shaped arrangement. The turbulators are provided only in the yoke region, but could be provided in the tooth region as well.

In a fourth embodiment, each turbulator is formed by a single fin or tab aligned with the coolant flow, with the turbulators extending radially throughout the yoke and tooth regions. This arrangement causes less pressure drop relative to the turbulators mounted transverse to the flow.

In all of the described embodiments, an increase in heat transfer is expected due to the roughness associated not only with the turbulators per se, but also with the cavity in the duct surface that results from forming the fin or turbulator from the lamination.

In each case, the tab or fin which forms all or part of a turbulator is cut and then bent out of the plane of the lamination, at an angle ranging from about 30° to about 90°, with a preferred range of about 30° to about 45°.

Thus, in its broader aspects, the invention relates to a dynamoelectric machine stator core assembly wherein adjacent packages of stacked laminations are separated by a plurality of radially extending spacer blocks, and wherein each adjacent pair of spacer blocks define in cooperation with adjacent axially spaced laminations, a cooling duct, the improvement comprising a plurality of turbulator elements in each cooling duct, each tubular element extending into said duct from one side of said adjacent axially spaced laminations.

Other objects and advantages of the invention will become apparent from the detailed description which follows.

BEST MODE FOR CARRYING OUT THE INVENTION

Figures 1, 2:
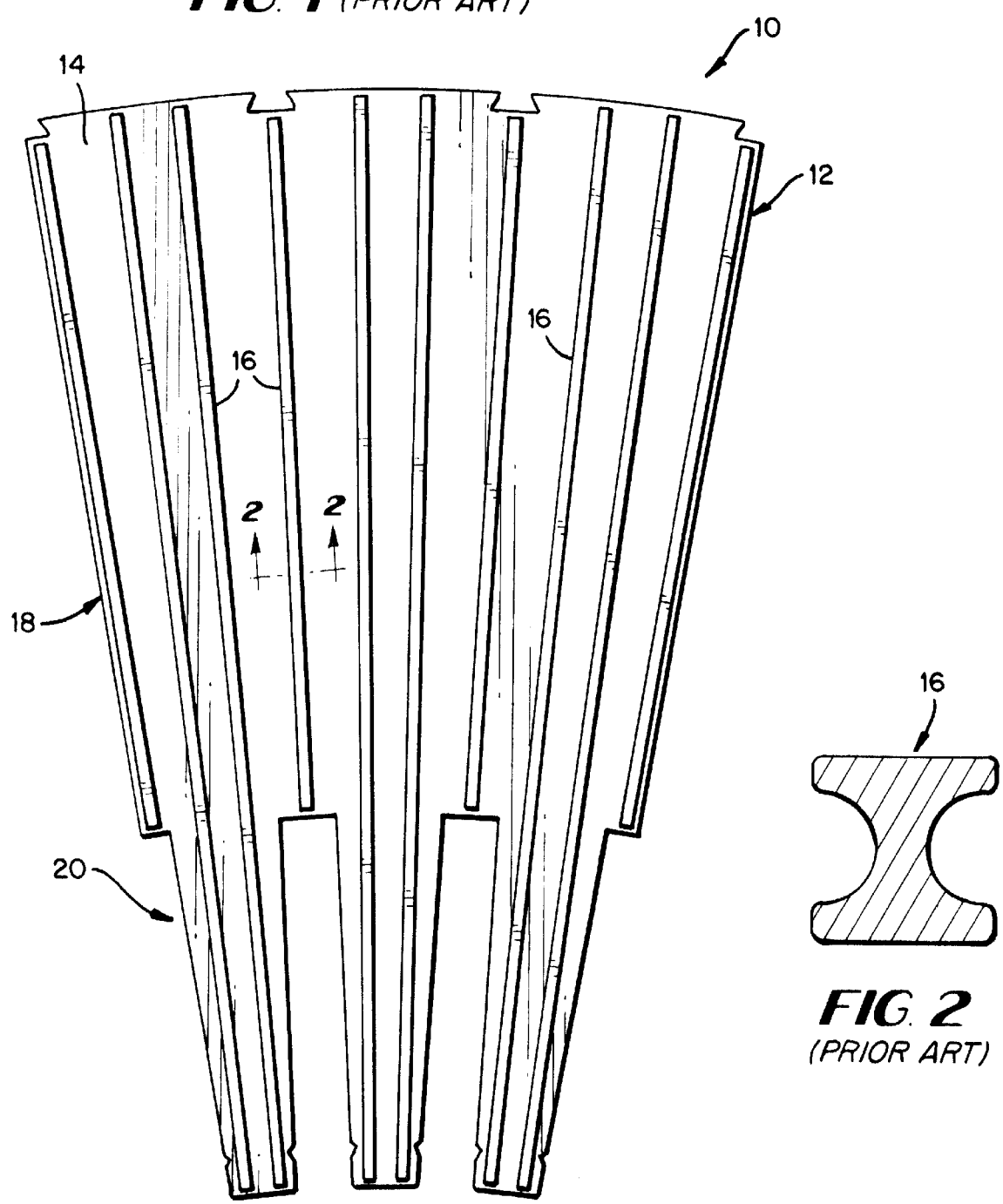
FIG. 1 is a partial side elevation of a conventional stator core lamination assembly.
FIG. 2 is a sectional view of a spacer block incorporated in the assembly shown in FIG. 1.

With reference to FIG. 1, a portion of a conventional stator core lamination assembly 10 is shown. The assembly may comprise approximately 70 discrete laminations within a "package" 12, Except as noted below, these laminations are typically 0.014 to 0.018 inch thick, and a package of laminations is approximately 1 to 3 inches thick. A plurality of inside spacer blocks or rods 16 are secured to the "outermost" lamination 14 of the package, and extend radially along the yoke portion 18 of the core lamination, and longer spacer blocks or rods which extend radially not only along the yoke region 18, but also along the radially inner tooth region 20. The lamination to which the inside spacer blocks are welded is thicker than the remaining laminations in the package, typically 0.025 inch thick. The inside spacer blocks 16 have a generally I-beam shape in cross section (see FIG. 2), with the flat sides engaging adjacent stator core lamination packages to thereby define a plurality of radially extending coolant passages or ducts between adjacent spacer blocks. Depending on the particular cooling arrangement, coolant flow may be in a radially inward or radially outward direction. Typically, the inside spacer blocks have a height of about 0.250 inches, which also then defines the height of the coolant passage. The width of the spacer blocks is also about 0.250 inches.

Figure 3:
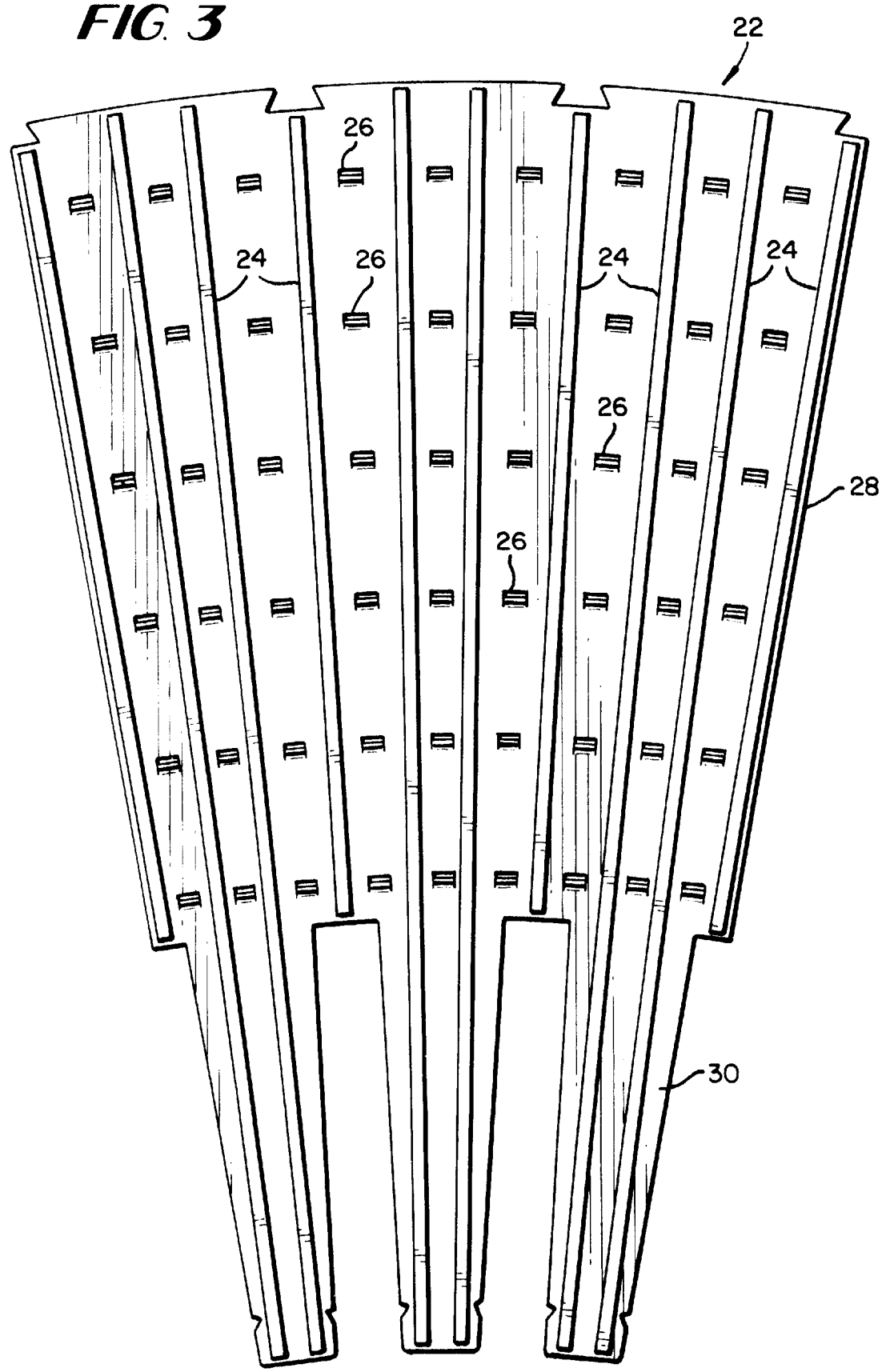
FIG. 3 is a partial side elevation of a stator core lamination assembly in accordance with a first embodiment of the invention.

Turning now to FIG. 3, a first embodiment of the subject invention is illustrated. The stator core lamination package 22 is generally similar to that shown in FIG. 1, in that radially oriented coolant passages are formed by radially extending spacer blocks 24 and two adjacent laminations of adjacent lamination packages. FIG. 3 also illustrates the location and orientation of a plurality of turbulators 26 within each of the radially extending cooling ducts. Thus, it can be seen that the turbulators 26 are located at regularly spaced intervals in the radial direction, and follow generally the curvature of the stator core assembly in a circumferential direction. It is also noted that the turbulators 26 appear only in the yoke region 28 of the stator core lamination assembly, and not in the tooth region 30.

Figure 3A:
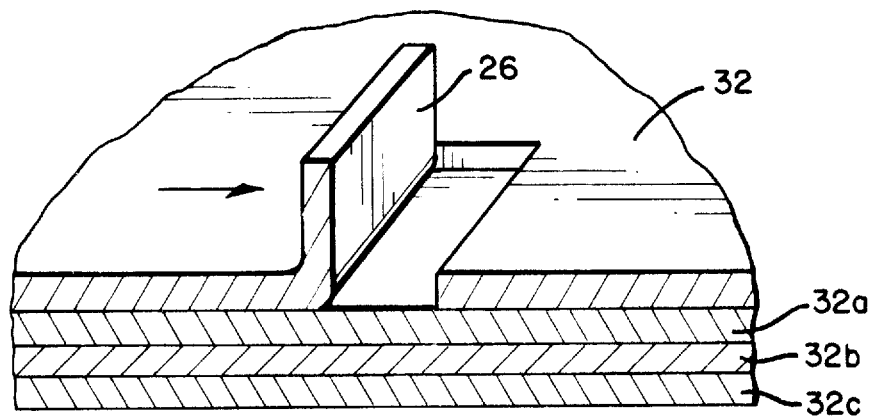
FIG. 3A is an enlarged partial perspective of a turbulator shown in FIG. 3.

With reference to FIG. 3A, it may be seen that the turbulators 26 are formed in only the single lamination 32 of the many laminations 32, 32a, 32b, 32c, . . . in the package which forms one wall of the cooling duct. In this embodiment, the turbulator 26 may have a width of 0.380 inch and is oriented 90° relative to the plane of the lamination assembly. It will be appreciated, however, that the turbulators may be formed at an angle of between, for example, 30° or 45° relative to the plane of the lamination as described below in connection with FIG. 4B. These turbulators are formed by ribs or tabs which are punched out of the lamination and then bent so as to extend into the coolant passage. This, of course, is done prior to assembly of the respective package. The lamination in which the turbulators are formed has a thickness of about 0.025 inch, while the other laminations 32a, b, c, etc. in the package have a wall thickness of about 0.014 inch. As in the conventional practice, there are about 70 laminations in each package. The ratio between the radial spacing of the turbulators (e.g., about 0.375 inch) to the height of the turbulators (e.g., about 0.25 inch) is preferably about 15 but may be between about 5 and 20.

Note that no spot welds are required to attach the turbulators. This not only obviates the extra manufacturing step of spot welding, but also precludes the possibility of the turbulator separating from the duct surface and traveling about the generator subject to the strong magnetic fields. The turbulators could, however, be welded directly to the laminations comprising the duct.

The inside spacer block 26 in accordance with this invention have a generally rectangular cross section and a height of approximately 0.125 inch. With turbulators having a height of about 0.025 inch, the turbulators extend into the coolant passage about 20% of the height of the passage, or about 10% of the duct hydraulic diameter.

In accordance with conventional practice, the lamination 32 forming the wall of the coolant passage is generally made of carbon steel, while the remaining laminations 32a, b, c, etc. in the package are formed of silicon steel. It should be noted here, however, that the selection of materials and the material thicknesses in accordance with this invention generally do not vary over those same dimensions/parameters in the prior art arrangement as illustrated, for example, in FIG. 1.

Figure 4:
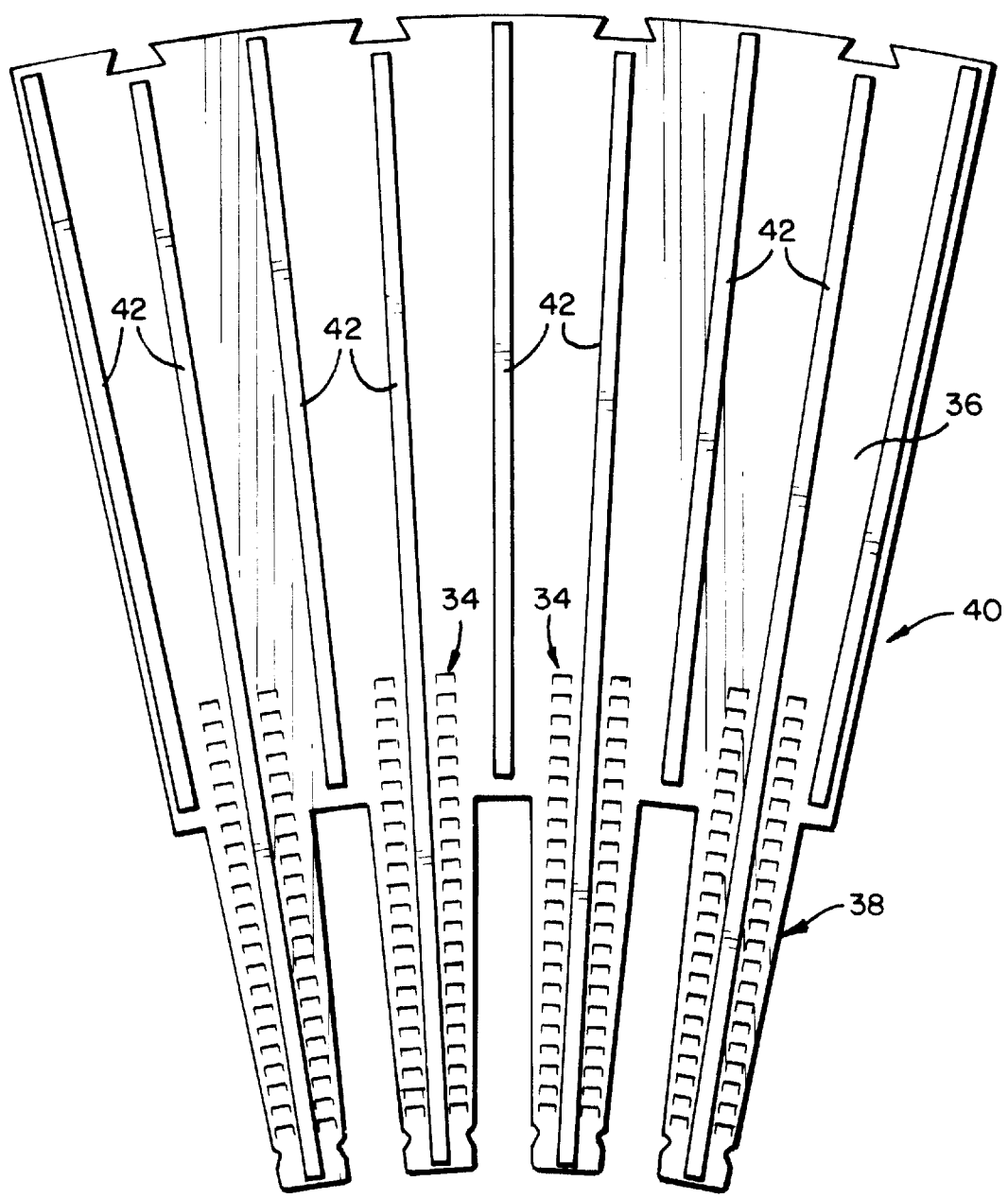
FIG. 4 is a partial side elevation of a stator core lamination assembly in accordance with a second embodiment of the invention.
Figure 4A:
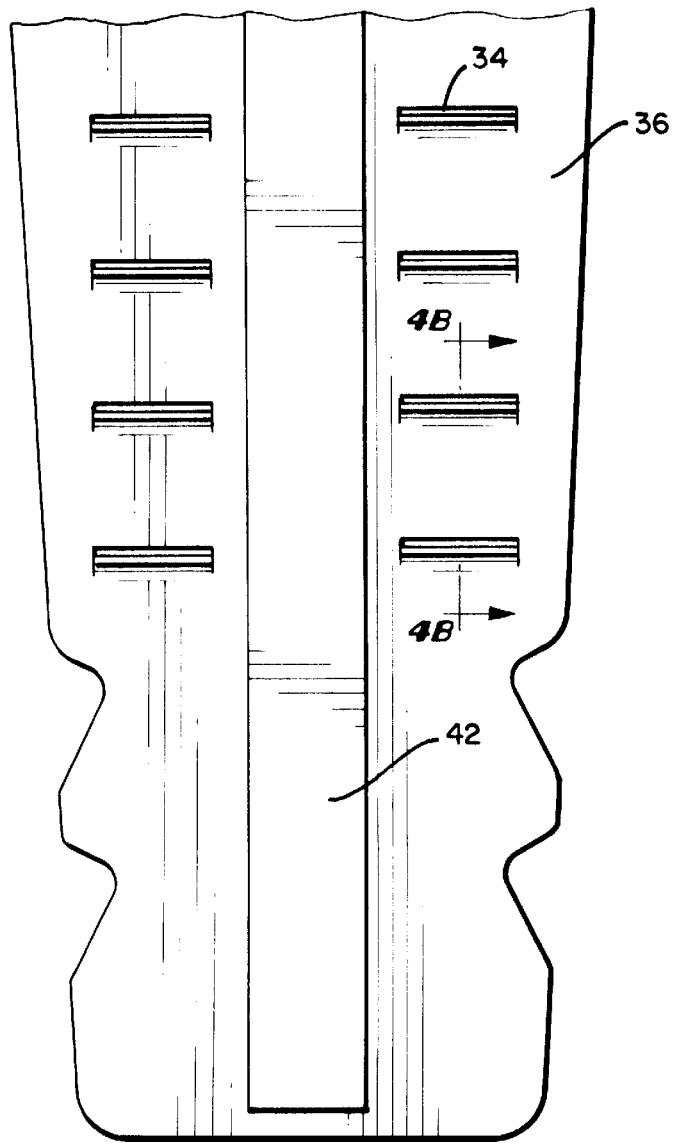
FIG. 4A is an enlarged detail taken from FIG. 4.
Figure 4B:
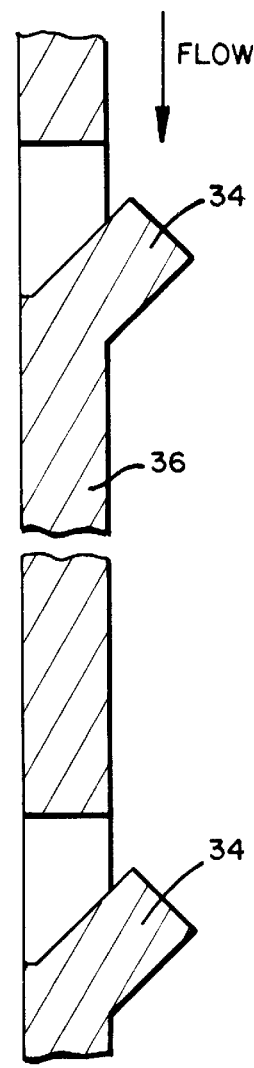
FIG. 4B is a section taken along the line 4B—4B of FIG. 4A.

Turning now to FIGS. 4, 4A and 4B, another and preferred embodiment of the invention is illustrated wherein turbulators 34 are formed in a lamination 36, primarily in the tooth regions 38 but extending partially into the yoke region 40. Again, the turbulators are formed in radial passages between interior radially arranged spacer rods 42, as further defined by adjacent laminations of adjacent packages. The radial spacing between turbulators and the manner in which the turbulators are formed are otherwise similar to the description provided above in connection with FIGS. 3 and 3A. One change, however, is that the turbulators 34 are punched out of the lamination 36 such that the turbulator extends at a 30°–45° angle with respect to the lamination proper. This is done primarily to facilitate the cut and punch process by which the turbulators are formed. Maximum protrusion of the turbulator 34 into the coolant passage is again about 0.025 inch.

Figure 5A:
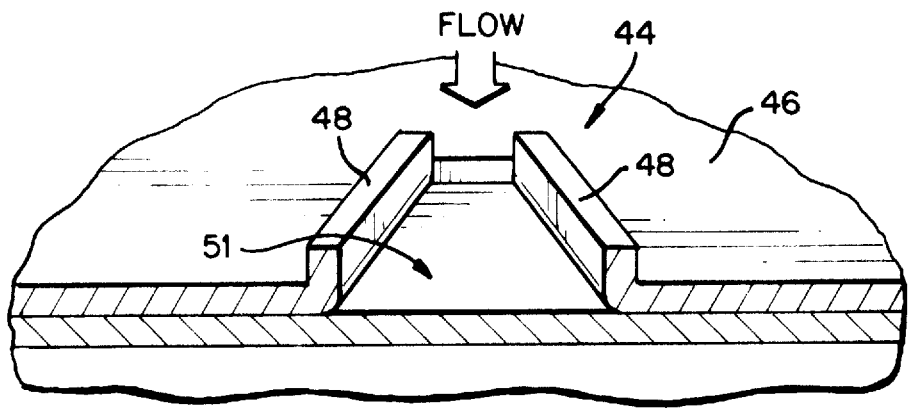
FIG. 5A is a partial perspective of a turbulator shown in FIG. 5.
Figure 5:
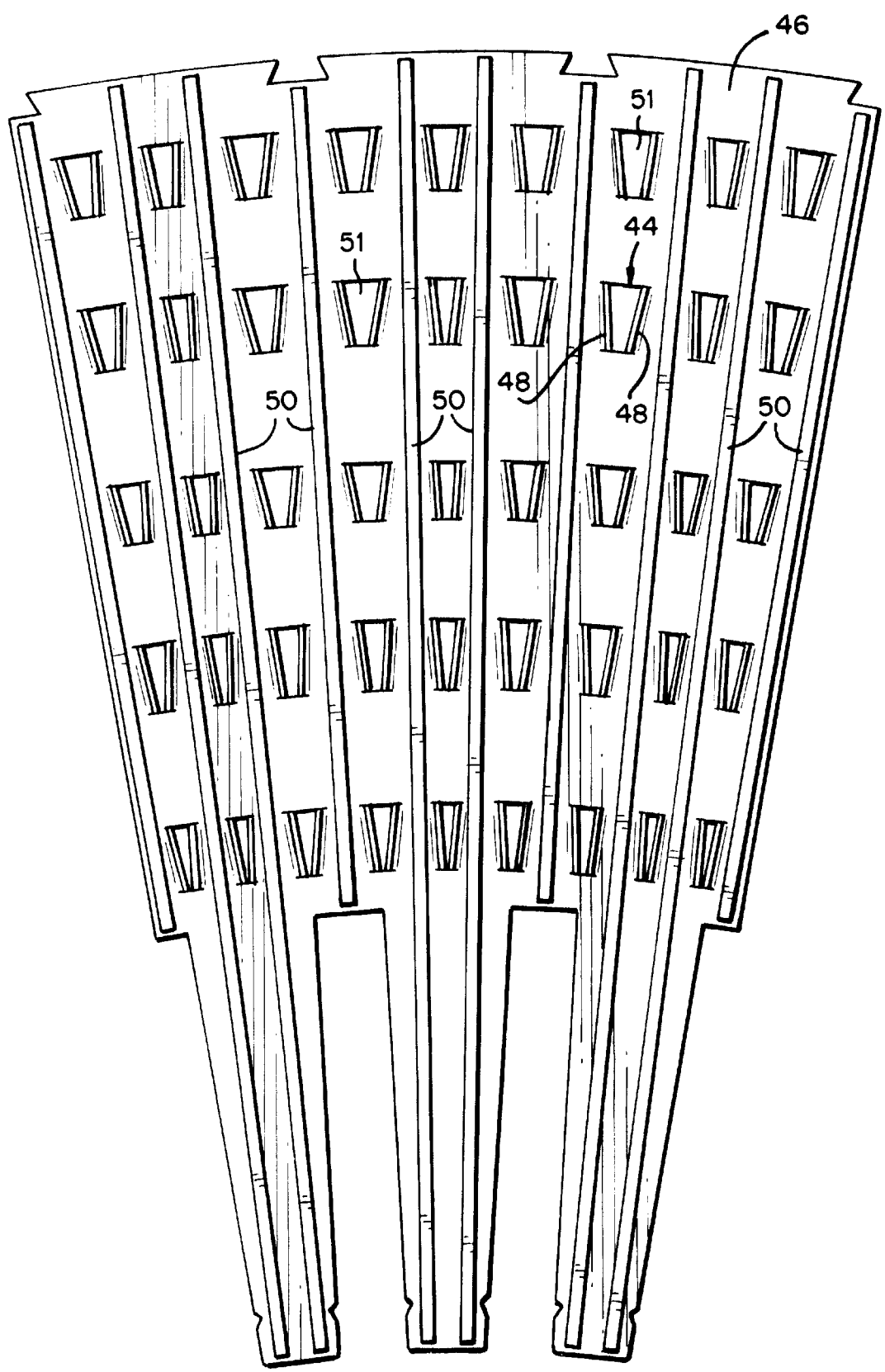
FIG. 5 is a partial side elevation of a stator core lamination assembly in accordance with a third embodiment of the invention.

Turning now to FIGS. 5 and 5A, yet another embodiment of the invention is illustrated wherein the turbulators 44 are formed in a respective lamination 46 of a respective lamination package by a pair of tabs 48 oriented to produce substantially V-shaped vortex generators. The arrow indicates normal orientation of the turbulators with respect to flow, but the orientation may be varied. The radial spacing between turbulators 44 is larger than with the turbulators 34, reflecting the radial component of the V-shape. Otherwise, the general arrangement of the turbulators within the yoke region of the stator core lamination between adjacent spacer blocks 50 is similar to that illustrated in FIGS. 3 and 3A. In this instance, however, the punch press operation is employed to cut and bend a pair of elements to create the above noted substantial V-shape. This embodiment can be expected to provide even further increases in heat transfer in light of the roughness associated with the larger cavity 51 in the duct surface that results from forming the fin or turbulator from the lamination.

Figure 6:
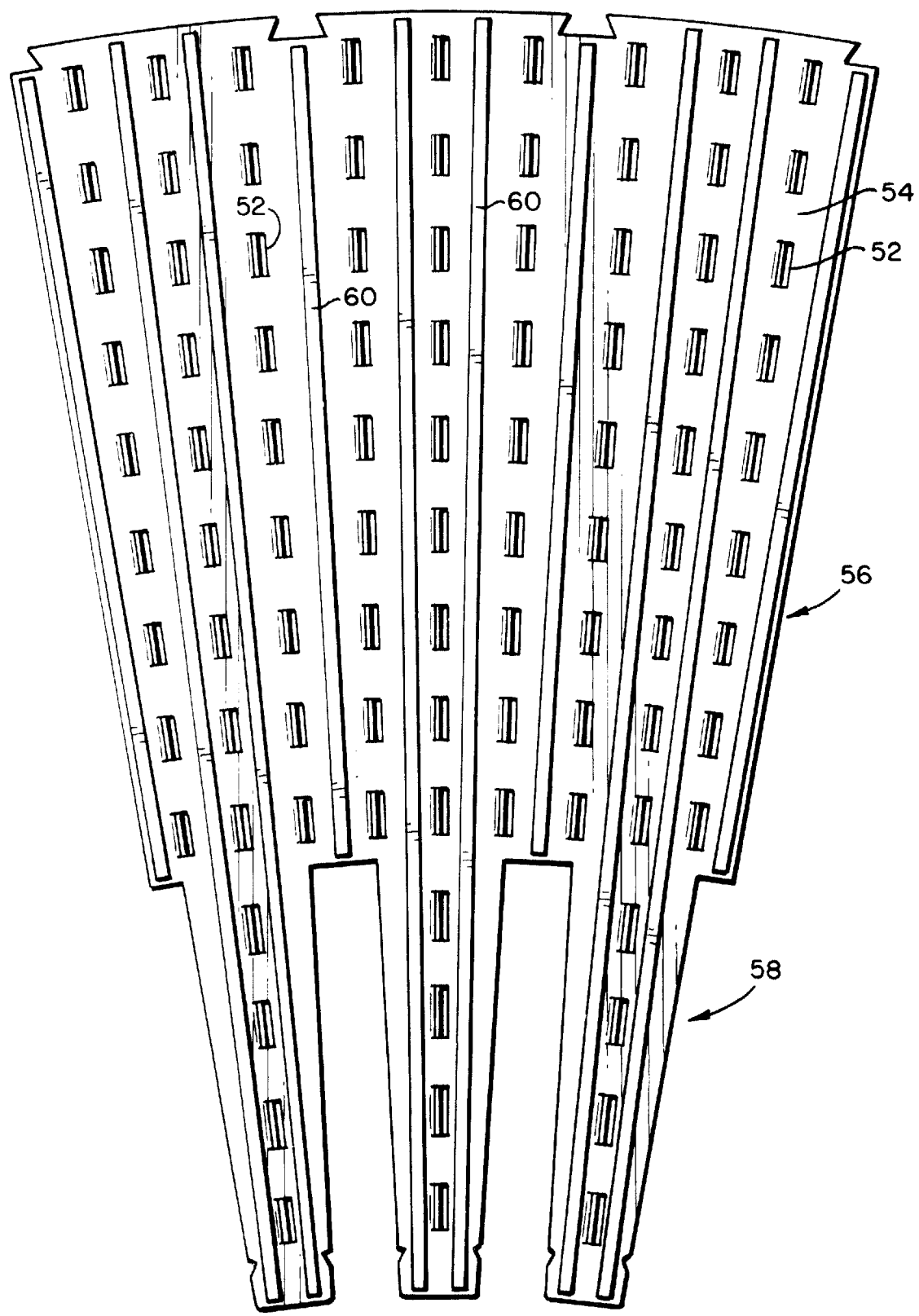
FIG. 6 is a partial side elevation of a stator core lamination assembly in accordance with a fourth embodiment of the invention.

With reference now to FIG. 6, yet another arrangement of turbulators is illustrated wherein, not only do the turbulators 52 extend radially along the stator core lamination 54 of a respective lamination package in both the tooth and yoke regions 56, 58, respectively, but the turbulator orientation has been changed so that the tab extends parallel to the spacer blocks 60 and parallel to the direction of flow.

It is noted that in each of the above described embodiments, turbulators are shown to extend from one side only of the respective cooling ducts. The turbulators could extend, however, from both sides of the ducts, in either aligned or staggered relationship in the radial direction.

Testing of the turbulated coolant ducts similar to the preferred arrangement illustrated in FIGS. 4, 4A and 4B, demonstrate that heat transfer performance at the turbulated wall is about twice as good as that found in smooth flow coolant passages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a dynamoelectric machine stator core assembly wherein adjacent packages of stacked laminations are separated by a plurality of radially extending spacer blocks, and wherein each adjacent pair of spacer blocks define in cooperation with adjacent axially spaced laminations, a radial cooling duct having a height dimension, the improvement comprising a plurality of turbulator elements in each radial cooling duct, each turbulator element extending into said radial cooling duct from at least one side of said adjacent axially spaced laminations, and wherein each turbulator has a height less than the height dimension of said radial cooling duct.

2. The improvement of claim 1 wherein each turbulator element is formed integrally with said one of said adjacent axially spaced laminations.

3. The improvement of claim 2 wherein each turbulator element is partially cut from said one of said adjacent axially spaced laminations, and bent into said duct, said turbulator element extending at an angle of about 30° to about 90° to said one of said adjacent axially spaced laminations.

4. The improvement of claim 2 wherein each turbulator element extends at an angle of about 30° to about 45° to said one of said adjacent, axially spaced laminations.

5. The improvement of claim 3 wherein each turbulator element is oriented substantially perpendicular to a flow direction of coolant through said radial cooling duct.

6. The improvement of claim 3 wherein each turbulator is formed by a pair of ribs arranged in a substantially V-shape.

7. The improvement of claim 1 wherein each turbulator has a height equal to about 20% of the radial cooling duct height or 10% of the radial cooling duct hydraulic diameter.

8. The improvement of claim 7 wherein the turbulators are radially spaced along said radial cooling duct such that a ratio between the radial spacing and said height dimension of said radial cooling duct.

9. The improvement of claim 8 wherein said turbulator elements are spaced radially along said radial cooling duct by about 0.375 inch.

10. The improvement of claim 1 wherein each turbulator comprises an integral tab partially cut from said one of said adjacent axially spaced laminations, thereby also creating a cavity along the respective radial cooling duct.

11. The improvement of claim 1 wherein said turbulators extend parallel to a flow direction.

12. The improvement of claim 1 wherein said radial cooling turbulator elements extend into said duct from both sides of said adjacent axially spaced laminations.

* * * * *